US008626367B2

(12) United States Patent (10) Patent No.: US 8,626,367 B2
Krueger et al. (45) Date of Patent: Jan. 7, 2014

(54) METHOD FOR OPERATING A HYBRID VEHICLE

(75) Inventors: Eric E. Krueger, Chelsea, MI (US); Christopher A. Kinser, Grand Blanc, MI (US); William R. Cawthorne, Milford, MI (US); Aniket Kothari, Southfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 805 days.

(21) Appl. No.: 12/711,332

(22) Filed: Feb. 24, 2010

(65) Prior Publication Data

US 2011/0208378 A1 Aug. 25, 2011

(51) Int. Cl.
*B60L 9/00* (2006.01)
(52) U.S. Cl.
USPC ............................... 701/22; 903/903; 903/910
(58) Field of Classification Search
USPC ............. 701/22; 903/903, 910; 333/117, 109; 180/65.245, 65.29, 65.28
See application file for complete search history.

(56) References Cited

U.S. PATENT DOCUMENTS 7,533,744 B2 * 5/2009 Mack ....................... 180/65.265

* cited by examiner

*Primary Examiner* — Thomas Black
*Assistant Examiner* — Luke Huynh
(74) *Attorney, Agent, or Firm* — Lionel D. Anderson; Reising Ethington P.C.

(57) ABSTRACT

An exemplary method for operating a hybrid vehicle in the event that there is a problem with an auxiliary power source, such as an internal combustion engine or a fuel cell. According to one embodiment, the method provides a power management scheme for a variety of situations where an auxiliary power source experiences a problem; this may include situations where an internal combustion engine runs out of fuel, where there is a mechanical or electrical malfunction, or any other instance where the auxiliary power source is unable to generate and/or provide electrical energy for the hybrid vehicle. The power management scheme conserves the vehicle's primary power source, which is typically a battery, in order to provide the hybrid vehicle with an extended driving range.

19 Claims, 2 Drawing Sheets

METHOD FOR OPERATING A HYBRID VEHICLE

TECHNICAL FIELD

The present invention generally relates to a hybrid vehicle and, more particularly, to a method for operating a hybrid vehicle in the event that there is a problem or issue with one or more of the vehicle's power sources.

BACKGROUND

Some hybrid vehicles use a primary power source for the majority of the vehicle's propulsion needs and supplement that with an auxiliary power source, when needed. If there is a problem with one or both of these power sources—whether it be an actual malfunction, simply a lack of fuel, or otherwise—then the overall range of the hybrid vehicle can be limited or reduced.

SUMMARY

According to one embodiment, there is provided a method for operating a hybrid vehicle having a primary power source and an auxiliary power source. This method may comprise the steps of: (a) determining if there is a problem with the auxiliary power source; (b) if there is a problem with the auxiliary power source, then decreasing energy consumption by the hybrid vehicle; and (c) monitoring the problem with the auxiliary power source to determine if it still exists.

According to another embodiment, there is provided a method for operating a hybrid vehicle having a primary power source and an auxiliary power source. This method may comprise the steps of: (a) determining if there is a problem with the auxiliary power source; and (b) if there is a problem with the auxiliary power source, then decreasing energy consumption by the hybrid vehicle by implementing a power management scheme that controls one or more performance-related tasks or non-performance-related tasks.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION OF THE EMBODIMENTS

The method described herein may be used to operate a hybrid vehicle in the event that there is a problem or issue with one or more of the vehicle's power sources. For instance, if an auxiliary power source like an internal combustion engine with a generator were to have a malfunction that prevented it from providing electrical energy, then the present method may be used to conserve and/or manage the remaining energy in the hybrid vehicle until the engine problem is resolved. A "hybrid vehicle," as used herein, broadly includes any vehicle that has two or more sources of power that can be used for purposes of vehicle propulsion. Some examples of suitable hybrid vehicles include, but are certainly not limited to, hybrid electric vehicles (HEVs), plug-in hybrid electric vehicles (PHEVs), extended-range electric vehicles (EREVs), two-mode hybrids, full hybrids, power-assist hybrids, mild hybrids, series hybrids, parallel hybrids, series-parallel hybrids, power-split hybrids, BAS or BAS-plus hybrids, hydraulic hybrids, pneumatic hybrids, or any other type of hybrid vehicle. This includes passenger cars, cross-over vehicles, sports-utility vehicles, recreational vehicles, trucks, buses, commercial vehicles, etc. Although the following description is provided in the context of an exemplary plug-in hybrid electric vehicle (PHEV) with a range-extending series hybrid configuration, it should be appreciated that the present method may be used with any hybrid vehicle and is not limited to any particular type.

Figure 1:
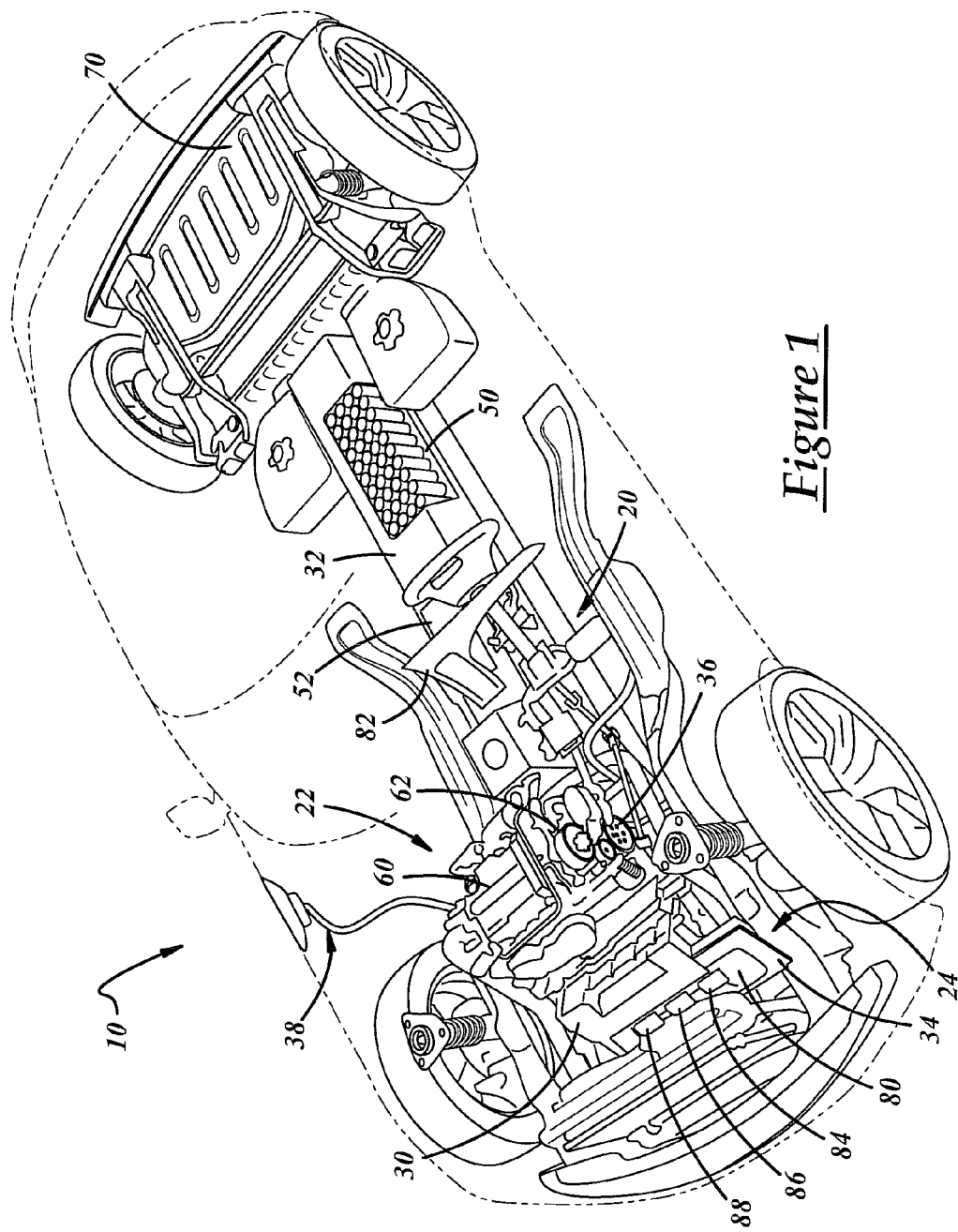
FIG. 1 is a perspective view depicting portions of an exemplary hybrid vehicle.

With reference to FIG. 1, there is shown a schematic view of an exemplary plug-in hybrid electric vehicle (PHEV) 10 having a range-extending series hybrid configuration where a high voltage battery drives an electric motor for vehicle propulsion, and an internal combustion engine drives a generator for producing electrical energy. According to this exemplary embodiment, hybrid vehicle 10 includes a primary power source 20, an auxiliary power source 22, and a control system 24. Because many of the components of hybrid vehicle 10 are generally known in the art and because many different components and arrangements may be used with the present method, a brief explanation is provided here in lieu of a detailed recitation of their individual structure and functionality.

Primary power source 20 is largely responsible for vehicle propulsion and, according to this particular embodiment, includes a charger 30, a battery 32, an inverter/converter 34, and one or more electric motor(s) 36. In general, battery charger 30 may receive electrical energy from one or more sources, convert and/or condition the electrical energy so that it is in a suitable form for battery 32, and provide the converted electrical energy to the battery where it is stored. During vehicle propulsion, battery 32 provides electrical energy to inverter/converter 34 where it is again converted, this time into a form suitable for electric motor 36, and provided to the electric motor for driving the wheels of the vehicle. During regenerative braking, electric motor 36 may act as a generator and provide electrical energy to battery 32 via inverter/converter 34.

Charger 30 may receive electrical energy from a variety of sources, including external power sources (e.g., standard AC electrical outlets, remote charging stations, external generators, etc.) and internal power sources (e.g., from an onboard generator). In the case of an external power source, charger 30 may receive the electrical energy through a suitable power coupling or charging cord 38 that connects the external power source to charger 30. Skilled artisans will appreciate that charger 30 may be provided according to any number of different embodiments, may be connected in any number of different configurations, and may include any number of different components, such as transformers, rectifiers, switching power supplies, filtering means, cooling means, sensors, control units and/or any other suitable components known in the art.

Battery 32 may store electrical energy that is used to drive electric motor 36, as well as to meet other electrical needs of the hybrid vehicle. According to an exemplary embodiment, battery 32 includes a high-voltage battery pack 50 (e.g., 40V-600V) and a sensor unit 52. Battery pack 50 may include a number of individual battery cells and may utilize any suitable battery chemistry, including those that are based on the following technologies: lithium ion, nickel metal hydride (NiMH), nickel cadmium (NiCd), sodium nickel chloride (NaNiCl), or some other battery technology. Battery 32 should be designed to withstand repeated charge and discharge cycles and may be used in conjunction with other energy storage devices, such as capacitors, super capacitors, inductors, etc. Those skilled in the art will appreciate that battery 32 may be provided according to any number of different embodiments, may be connected in any number of different configurations, and may include any number of different components, like sensors, control units and/or any other suitable components known in the art.

Inverter/converter 34 may act as an intermediary between battery 32 and electric motor 36, as these two devices are often times designed to function according to different operational parameters. For example, during vehicle propulsion inverter/converter 34 may step-up the voltage from battery 32 and convert the current from DC to AC in order to drive electric motor 36, while during regenerative braking the inverter/converter may step-down the voltage generated by a braking event and convert the current from AC to DC so that it can be properly stored by the battery. In a sense, inverter/converter 34 manages how these different operational parameters (i.e., AC versus DC, various voltage levels, etc.) work together. Inverter/converter 34 may include an inverter for DC to AC conversion, a rectifier for AC to DC conversion, a step-up converter or transformer for increasing the voltage, a step-down converter or transformer for decreasing the voltage, other suitable energy management components, or some combination thereof. In the exemplary embodiment shown, inverter and converter units are integrated into a single bi-directional device, however, other embodiments are certainly possible. It should be realized that inverter/converter 34 may be provided according to any number of different embodiments (e.g., with separate inverter and converter units, bi-directional or uni-directional, etc.), may be connected in any number of different configurations, and may include any number of different components, like cooling systems, sensors, control units and/or any other suitable components known in the art.

Electric motor 36 may use electrical energy stored in battery 32 and/or provided by auxiliary power source 22 to drive the vehicle wheels, which in turn propels the hybrid vehicle. While FIG. 1 schematically depicts electric motor 36 as a single discrete device, the electric motor may be combined with a generator (a so-called "mogen") or it may include multiple electric motors (e.g., separate motors for the front and rear wheels, separate motors for each wheel, separate motors for different functions, etc.), to cite a few possibilities. Primary power source 20 is not limited to any one particular type of electric motor, as many different motor types, sizes, technologies, etc. may be used. In one example, electric motor 36 includes an AC motor (e.g., a three-phase AC induction motor, a multi-phase AC induction motor, etc.) as well as a generator that can be used during regenerative braking. Electric motor 36 may be provided according to any number of different embodiments (e.g., AC or DC motors, brushed or brushless motors, permanent magnet motors, etc.), may be connected in any number of different configurations, and may include any number of different components, like cooling features, sensors, control units and/or any other suitable components known in the art.

Auxiliary power source 22 may provide power in the event that battery 32 is depleted and, according to this particular embodiment, includes an engine 60 and a generator 62. In general, engine 60 turns generator 62, which in turn creates electrical energy that may be used to recharge battery 32, to drive electric motor 36 or other electrical devices in the hybrid vehicle, or to do both. The specific allocation of electrical energy from generator 62 may be dictated by the current state of the battery (e.g., if the battery has a low state-of-charge (SOC) value, etc.), current performance demands on the motor (e.g., is the driver trying to accelerate the vehicle), etc. In another embodiment, engine 60 is replaced with a fuel cell, a hydraulic or pneumatic system, or some other alternative energy supply that is capable of providing electrical energy to the hybrid vehicle.

Engine 60 may drive generator 62 using conventional internal combustion techniques, and may include any suitable type of engine known in the art. Some examples of suitable engines include gasoline, diesel, ethanol, flex-fuel, naturally aspirated, turbo-charged, super-charged, rotary, Otto-cycle, Atkins-cycle and Miller-cycle engines, as well as any other suitable engine type known in the art. According to the specific embodiment shown here, engine 60 is a small fuel-efficient engine (e.g., a small displacement, turbo-charged four-cylinder engine) that receives fuel from fuel tank 70 and uses the mechanical output of the engine to turn generator 62. Skilled artisans will appreciate that engine 60 may be provided according to any number of different embodiments, may be connected in any number of different configurations (e.g., engine 60 could be part of a parallel hybrid system where the engine is also mechanically coupled to the vehicle wheels instead of exclusively being used to generate electricity), and may include any number of different components, like sensors, control units and/or any other suitable components known in the art.

Generator 62 is mechanically coupled to engine 60 so that the mechanical output of the engine causes the generator to create electrical energy that may be provided to battery 32, electric motor 36, or both. As with all of the exemplary components described herein, generator 62 may include one of any number of suitable generators known in the art and is certainly not limited to any particular type. It is worth noting that generator 62 may be provided according to any number of different embodiments (e.g., the generator of motor 36 and generator 62 may be combined into a single unit), may be connected in any number of different configurations, and may include any number of different components, like sensors, control units and/or any other suitable components known in the art. Again, the preceding description of exemplary hybrid vehicle 10 and the illustration in FIG. 1 are only intended to illustrate one potential hybrid arrangement and to do so in a general way. Any number of other hybrid arrangements and architectures, including those that differ significantly from the one shown in FIG. 1, may be used instead.

Control system 24 may be used to control, govern or otherwise manage certain operations or functions of hybrid vehicle 10 and, according to one exemplary embodiment, includes a hybrid control unit 80 and a user interface 82. Hybrid control unit 80 may use stored algorithms or other electronic instructions to manage the activities of the various components and devices of both the primary power source 20 and the auxiliary power source 22 so that these two systems can seamlessly interact with one another and can react to a variety of changing conditions. Depending on the particular embodiment, hybrid control unit 80 may be a stand-alone electronic module (e.g., a vehicle integration control module (VICM), a traction power inverter module (TPIM), a battery power inverter module (BPIM), etc.), it may be incorporated or included within another electronic module in the vehicle (e.g., a power train control module, an engine control module, etc.), or it may be part of a larger network or system (e.g., a battery management system (BMS), a vehicle energy management system, etc.), to name a few possibilities.

Moreover, hybrid control unit 80 may include any combination of electronic processing devices 84, memory devices 86, input/output (I/O) devices 88, and/or other known components, and may perform various control and/or communication related functions. Processing device 84 may include any type of suitable electronic processor (e.g., a microprocessor, a microcontroller, an application specific integrated circuit (ASIC), etc.) that executes instructions for software, firmware, programs, algorithms, scripts, etc. This processor is not limited to any one type of component or device. Memory device 86 may include any type of suitable electronic memory means and may store a variety of data and information. This includes, for example: sensed vehicle conditions; look-up tables and other data structures; software, firmware, programs, algorithms, scripts, and other electronic instructions; component characteristics and background information, etc. The present method—as well as any other electronic instructions and/or information needed for such tasks—may also be stored or otherwise maintained in memory device 86. Hybrid control unit 80 may be electronically connected to other vehicle devices and modules via I/O device 88 and suitable connections, like a communications bus, so that they can interact as required. These are, of course, only some of the possible arrangements, functions and capabilities of hybrid control unit 80, as others are certainly possible.

User interface 82 may be used to exchange information between a vehicle user and the vehicle, and may do so in a variety of ways. For instance, user interface 82 may receive user requests, instructions and/or other input from a vehicle user via: a touch-screen display, a pushbutton or other vehicle control, a keyboard, a microphone (e.g., cases where input is verbally provided and interpreted by a human-machine interface (HMI)), or a wireless communication module (e.g., cases where input is wirelessly provided from a mobile communications device, laptop, desktop, website, backend facility, etc.), to cite a few examples. In addition, user interface 82 may be used to provide vehicle status, reports and/or other output to the vehicle user. The same devices and techniques for providing input, as well as others like a vehicle audio system and instrument panel, may also be used to provide output. Other user interfaces may be provided instead, as the exemplary ones shown and described herein represent only some of the possibilities. The present method may utilize any user interface to exchange information with the vehicle and is not limited to any particular type.

The exemplary hybrid vehicle 10 may include more, less or a different combination of elements, components, devices and/or modules than those illustrated and described here, as the present method is not limited to this particular embodiment. For example, hybrid vehicle 10 may include parts such as: a hybrid transmission, a power-split device, a gear box, one or more clutches, a flywheel and/or other hybrid drivetrain components; a low-voltage electrical circuit or bus (e.g., standard 12V, 18V or 42V circuits), an accessory power module (APM), electronic accessories, different electronic modules, a telematics unit, additional electric motors and/or other electronic devices; as well as any other devices that may be found on hybrid vehicles. The components, devices and/or modules shown in FIG. 1 may be integrated or otherwise combined with other parts of the hybrid vehicle, as the illustration in that figure is only meant to generally and schematically illustrate one potential hybrid system arrangement.

Figure 2:
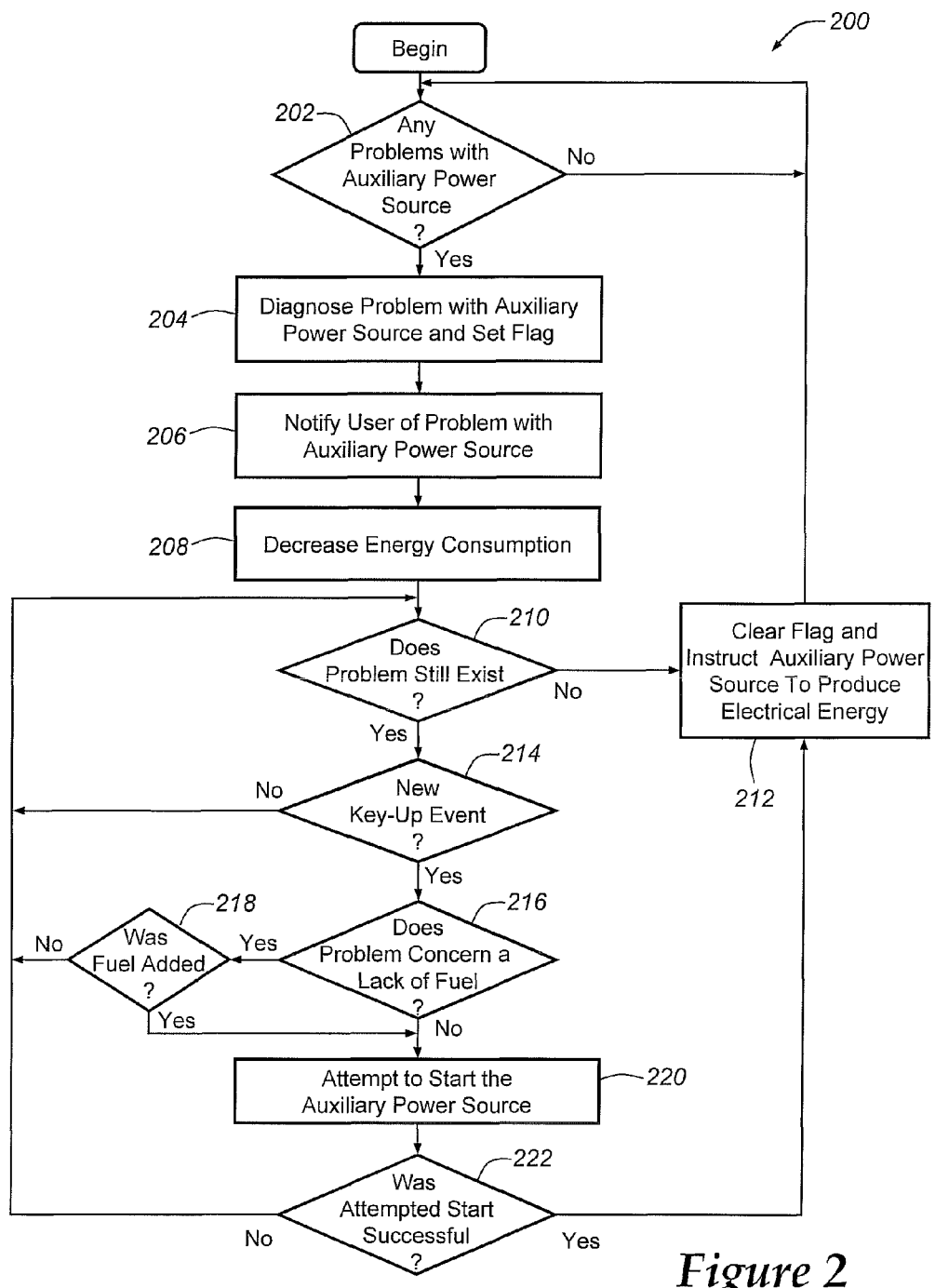
FIG. 2 is a flowchart illustrating certain steps of an exemplary method that may be used to operate a hybrid vehicle, such as the exemplary one shown in FIG. 1.

Turning now to FIG. 2, an exemplary method 200 is provided for operating a hybrid vehicle in the event that there is a problem or difficulty with an auxiliary power source, such as an internal combustion engine or a fuel cell. Method 200 provides a power management scheme for a variety of situations where an auxiliary power source experiences a problem; this may include, for example, situations where an internal combustion engine runs out of fuel, where there is a mechanical or electrical malfunction, or any other instance where the auxiliary power source is unable to generate and/or provide electrical energy for the hybrid vehicle. According to one embodiment, the power management scheme conserves the vehicle's primary power source, which is typically a battery, in order to provide the hybrid vehicle with enough driving range to reach a service facility and avoid having to tow the vehicle.

Method 200 begins at step 202, where it determines if there are any problems or issues with the auxiliary power source. Step 202 may employ any number of different techniques or approaches to make this determination, and it may keep monitoring the status of auxiliary power source 22 until it senses a problematic condition. Problems or issues with auxiliary power source 22 may include simple problems (e.g., engine 60 is low on fuel), mechanical problems (e.g., engine 60 is experiencing mechanical difficulties that prevent it from properly operating generator 62), electrical problems (e.g., there is a disruption in the connections between generator 62 and battery 32), and/or any other problems or issues regarding the generation or delivery of electrical energy by auxiliary power source 22. Because of the diverse nature of the potential problems that can beset auxiliary power source 22, step 202 may employ any number of different techniques for detecting or sensing such problems. For instance, step 202 may periodically request fuel level readings or simply receive fuel level readings when the level in fuel tank 70 falls below a certain point. The point at which step 202 is notified of the low fuel level condition may vary depending on the particular parameters and characteristics of the hybrid vehicle, and could even be designed to detect situations where the fuel level is being depleted at an unusually high rate, for example. Step 202 may also determine the mechanical and/or electrical status of various components within the hybrid vehicle (e.g., internal combustion engine 60, generator 62, etc.) by querying certain control units, electronic modules, vehicle systems, etc. and requesting their status. In another example, step 202 may look to battery 32 or some node in order to determine the status of the electrical connections between auxiliary power source 22 and primary power source 20 and to make sure that the auxiliary power source is properly providing electrical energy to the primary power source. If there is a problem or issue with either the generation or the delivery of electrical energy, no matter where it resides, then it can be detected. In order to accomplish this, hybrid control unit 80 may communicate with battery sensor unit 52 or some other control unit, module, system, etc. In general, step 202 may employ any suitable technique or approach to determine if there are any problems or issues with the auxiliary power source, and is not limited to the exemplary techniques cited above. If step 202 does not detect a problem with auxiliary power source 22, then it may loop back for continued monitoring; if such a problem is detected, then the method proceeds to step 204.

Step 204 attempts to diagnose the problem or issue with the auxiliary power source and, depending on the circumstances, may set a flag or other electronic indicator. In the case of a low fuel condition, for example, the diagnosis in step 204 may be quite simple and could result in one or more flags being set. In the case of a mechanical and/or electrical malfunction, step 204 may employ any number of different diagnostic or other trouble-shooting techniques to try and identify and potentially resolve the problem. For instance, hybrid control unit 80 may gather diagnostic trouble codes (DTCs), sensor readings and/or other information from one or more electronic modules in the hybrid vehicle, such as an engine control module, and use the information to try and diagnose the problem at hand. In some instances, step 204 may not be able to diagnose or resolve the problem, at which point the vehicle user could be notified that they should bring the hybrid vehicle to a service station. Setting a flag or other electronic indicator is an optional step, but it may be helpful in subsequent steps when method 200 tries to determine if the problem or condition has been resolved. Step 204 may store a flag or other electronic indicator in any number of locations, including memory device 86 of hybrid control unit 80.

Step 206 notifies the vehicle user of the problem or issue concerning the auxiliary power source, and may do so using any number of different methods or techniques. This includes, for example, notifying the vehicle user with visual and/or audio notifications through user interface 82 or any other suitable means in the hybrid vehicle. The notification may include a variety of different pieces of information. For instance, step 206 may simply inform the vehicle user that a problem or issue with the auxiliary power source has been detected, it may provide the vehicle user with details regarding the nature and extent of the problem, it may inform the vehicle user of the remedial actions that it intends to take so that the user is not surprised or alarmed when such actions are implemented, and/or it may provide other information deemed suitable for the situation. To illustrate, consider the example where step 204 determines that internal combustion engine 60 is low on fuel and will soon be unable to operate generator 62, which provides supplemental electrical energy to the hybrid vehicle. Step 206 could notify the vehicle user of the low fuel condition, suggest that they begin to look for a gas station, and also inform them that in response to this condition certain electrical loads in the hybrid vehicle are going to be curtailed or shut down in order to conserve electrical energy. It is also possible for step 206 to send a wireless communication to the vehicle user's mobile device, or to a computer, server, back-end facility, etc. Skilled artisans should appreciate that other notification and presentation options are possible.

It is also possible for step 206 to present the vehicle user with one or more proposed remedial actions and to provide them with an opportunity to manually override such actions. As described below in more detail, these remedial actions may include such things as reducing vehicle speed, acceleration, etc., setting limits on the top speed or acceleration of the vehicle, disabling non-essential electrical loads, or pursuing other measures that decrease energy consumption by the hybrid vehicle. There may be situations, however, where the vehicle user does not want such remedial actions to be invoked, in which case step 206 may provide them with a manual override or cancelation option. Consider the example where the hybrid vehicle is low on fuel and this condition has been conveyed to the vehicle user along with several proposed remedial or corrective actions, including limiting the speed of the vehicle in order to conserve the remaining electrical energy. If the vehicle user recognizes that the vehicle is only a short distance from a gas station or if the vehicle user is in an emergency situation, then they may wish to override the proposed remedial actions. The manual override may be accessed by allowing the user to press a button, select a radio soft key, or activate the override through an onboard telematics system. These are, of course, only some of the potential examples where a vehicle user may want to override proposed remedial or corrective actions by the hybrid vehicle, as others surely exist.

In the event that there is a problem with the auxiliary power source and the vehicle user has not manually overridden the proposed remedial actions, step 208 may decrease electrical energy consumption by the hybrid vehicle. This may be accomplished in any number of different ways, including developing and implementing a power management scheme that conserves electrical energy by decreasing its rate of consumption. Since auxiliary power source 22 is unable to produce electrical energy or has limited means for doing so, it may be useful for step 208 to curtail or reduce the consumption of electrical energy by putting certain limits on performance-related tasks and/or non-performance-related tasks. Such remedial actions are intended to increase the vehicle driving range so that the vehicle user has a better opportunity to address the problem at hand, which may include adding fuel to the hybrid vehicle or driving it to a service station, for example. According to one potential embodiment, if the state-of-charge (SOC) level of battery 32 falls below a certain level (e.g., a lower or minimum design point), then step 208 may shut down the propulsion power altogether and may do so in a smooth and gradual manner. By cutting off the propulsion power and opening high voltage contactors in the hybrid vehicle, method 200 is able to avoid damage to battery 32 that could occur at such low SOC levels. This decrease in energy consumption may take place in multiple stages as the available energy approaches zero, thus maximizing the propulsion-enabled duration of the vehicle.

A "performance-related task," as used herein, broadly includes all tasks, actions or acts that are taken by the hybrid vehicle and involve propelling or driving the hybrid vehicle. Such tasks oftentimes involve primary power source 20. Some examples of how step 208 may put limits on performance-related tasks include controlling the torque and/or speed of electric motor 36, controlling the speed and/or acceleration of the hybrid vehicle, controlling the operation, speed, etc. of engine 60, as well as many others. These energy conserving remedial actions may be implemented with or without the vehicle user's input, depending on the nature and significance of the remedial action, etc. For instance, step 208 may temporarily take over or influence certain performance-related tasks by automatically providing electronic control signals to one or more devices within primary power source 20 and/or auxiliary power source 22. These automatically-generated control signals—as opposed to signals emanating from the manually controlled accelerator pedal—can temporarily control certain aspects of the hybrid vehicle's operation and may originate with hybrid control unit 80, an engine control module, or some other suitable source. In one embodiment, step 208 may limit the output torque of motor 36 so that it does not surpass a certain threshold (skilled artisans will appreciate the relationship between motor torque and electrical energy consumption) and/or limit the overall speed of the hybrid vehicle to a certain velocity. The limits or thresholds used by this step may be absolute limits (e.g., 50 mph) or they may be relative limits (e.g., reduce motor torque by 40% or limit motor torque to 60% of its maximum capability). Of course, any changes or transitions to performance-related tasks may be done in a blended or smoothed manner so that it does not alarm the driver, and they may take into account factors such as current road and/or weather conditions. At this point, step 208 may optionally place auxiliary power source 22 in a sleep, standby or low power consumption mode. Other techniques for reducing electrical energy consumption by controlling performance-related tasks may also be used.

A "non-performance-related task," as used herein, broadly includes all tasks, actions or acts that are taken by the hybrid vehicle and do not directly involve propelling or driving the hybrid vehicle. An example of how step 208 may address non-performance-related tasks includes controlling one or more non-essential power loads. For instance, step 208 may reduce electrical energy consumption by limiting the amount of energy used by higher voltage non-essential power loads like AC compressors and cabin heaters, as well as by lower voltage non-essential loads such as vehicle accessories (e.g., heated seats, infotainment systems, etc.) The preceding examples are only representative of some of the non-essential power loads that may be limited or controlled by step 208 in order to reduce electrical energy consumption; other examples are certainly possible. Depending on the particular remedial or corrective action being taken, step 208 may curtail or limit the amount of electrical energy that the non-essential power loads can draw, or it can actually turn off the non-essential power load altogether. For example, step 208 could set a power threshold on an AC compressor so that it is limited to a certain power level or it could disable the AC compressor totally. The particulars of the remedial action may be driven by the nature and extent of the problem at hand or the current condition of the battery, for example; for less serious problems where there is ample electrical energy on hand, non-essential power loads may simply be limited or capped at a certain level; for more serious problems or situations where scarce amounts of electrical energy are available (e.g., when battery 32 has a low SOC level), non-essential power loads may be disabled altogether. Skilled artisans will appreciate that steps 206 and 208 may be performed in any order. As described above, these energy conserving remedial actions may be implemented with or without the vehicle user's input, depending on the nature and significance of the remedial action, etc.

Step 210 monitors the problem or issue with the auxiliary power source to see if it still exists. Sometimes, problems such as these correct themselves so that the issue does not exist anymore. For example, a clogged fuel line that prevents engine 60 from operating properly may become unclogged as the vehicle is being driven. In another example, a software issue concerning auxiliary power source 22 may be resolved by hybrid control unit 80 or some other module, in which case the problem identified in step 202 may no longer be an issue. Those skilled in the art will appreciate that any number of different circumstances could lead to the resolution of the previously identified problem. Furthermore, a variety of suitable techniques may be used for this monitoring step, including those described above in connection with step 202. This step of checking to see if the previously determined problem still persists may be performed one or more times throughout the course of method 200, and is not limited to the specific sequential spot shown in FIG. 2. If the problem or issue no longer exists, then step 212 may clear the flag or other electronic indicator that was previously set, and may instruct secondary power source 22 to begin producing electrical energy in order to replenish deficiencies with primary power source 20. In the exemplary embodiment discussed above, this may result in step 212 instructing engine 60 to drive generator 62 so that electrical energy is created and delivered to battery 32 and/or is used by the hybrid vehicle. Afterwards, method 200 may loop back to step 202 so that it can continue to monitor for problems or issues with the auxiliary power source. During step 212, the method may also notify the vehicle user if the problem or issue has been resolved. If the problem with the auxiliary power source still exists, then method 200 proceeds to the next step.

Step 214 checks to see if a new key-up event has occurred. Skilled artisans will appreciate that key-up events—which can include all types of events (both manual and automatic) where one or more aspects of the vehicle is turned on—will sometimes solve problems in the hybrid vehicle, including problems or issues with auxiliary power source 22. The reason for this is varied, but may be because many electronic components, circuits, controllers, modules, etc. are reset in software following a key-up event. Since key-up events can be promising for the resolution of certain problems, step 214 checks to see if a key-up event has occurred. Step 214 may use any number of different techniques or methods to determine if a 'key-up' event has occurred. This includes, for example, receiving electronic signals from an ignition unit or any other suitable module indicating that a vehicle user has inserted an ignition key or otherwise attempted to turn on the vehicle. In another embodiment, step 214 may detect the occurrence of a key-up event by monitoring the status or state of battery 32 to determine if it is providing power to the hybrid vehicle following a period where the vehicle was turned off. These are, of course, only some of the potential ways in which step 214 may determine if a key-up event has occurred, as any other techniques may be used as well. If no key-up event has occurred, then method simply returns to step 210 for continued monitoring; if a key-up event has occurred, then the method may proceed to step 216.

Step 216 is an optional step that checks to see if the previously determined problem with the auxiliary power source was due to a lack of fuel. One reason for performing this step involves wear-and-tear on a fuel pump and other components that may happen when one attempts to start an engine that has no fuel available. Generally speaking, once method 200 determines that a new key-up event has occurred, it wants to try and start the hybrid vehicle to see if the problem with the auxiliary power source has been fixed. However, a fuel pump and other components may be damaged if the hybrid vehicle attempts to start without any fuel. Thus, step 216 first checks to see if the problem with the auxiliary power source involves or pertains to a lack of fuel; if it does, then step 218 checks to see if any fuel has been added. Since method 200 has already diagnosed the auxiliary power source problem or issue in step 204, it may retrieve stored information relating to this condition to confirm that the problem is due to lack of fuel. Such information may be contained within the flag or other electronic indicator that was previously saved, or it may be obtained in other ways. For instance, several techniques can be used to determine if fuel has been added; these include, but are not limited to, receiving a signal from a fuel level sensor, receiving a signal from a fuel evaporation system, or receiving a signal from a sensor that is coupled to a fuel tank cover or door to see if it has been moved or opened. If the problem with the auxiliary power source is due to a lack of fuel and no fuel has been added, then it is reasonable to assume that the problem still persists. In this case, the method would simply loop back to step 210 without attempting to start the hybrid vehicle and risk damaging the fuel pump. If the problem or issue with the auxiliary power source was not due to a lack of fuel, or if it was due to a lack of fuel but fuel has been subsequently added, then the method may proceed to the next step.

Step 220 attempts to start the auxiliary power source and determine if the problem or issue with the auxiliary power source still persists. This step is performed in the hopes that the recent key-up event will have changed something that will now enable auxiliary power source 22 to properly operate. This step may be executed in a number of different ways, but in the context of the example above, step 220 may send some type of control signal to an engine control unit or the like to start up engine 60. Such a control signal can originate from hybrid control unit 80 or any other suitable source and can be used to bring auxiliary power source 22 out of the low-power sleep mode described above. Other techniques may be used to try and start auxiliary power source 22. In the example of an auxiliary power source that includes a fuel cell, step 220 may include attempts by the method to initiate or otherwise start the fuel cell so that it begins producing electrical energy.

Step 222 then checks to see if the attempted start of the auxiliary power source was successful. If auxiliary power source 22 was successfully started such that it is providing electrical energy to primary power source 20, then the problem that was previously detected should be resolved. Step 222 may make this determination in any number of different ways, including checking various diagnostic trouble codes (DTCs), receiving information from various sensors, communicating with components, modules, systems, etc. throughout the hybrid vehicle, or employing any other appropriate techniques. If the attempted start was not successful, then method 200 loops back to step 210 for continued monitoring. If the attempted start was successful, which indicates that the problematic condition has been resolved, then the method may proceed to step 212 in order to clear any flags or other electronic indicators and instruct auxiliary power source 22 to begin producing electrical energy. As explained above, this step may involve operating engine 60, which drives generator 62, which in turn generates electrical energy that may be used to restore battery 32 or power other components of the hybrid vehicle, if so needed. It is also possible for step 212 to remove, reset or otherwise adjust the remedial or corrective actions that were previously taken in order to the electrical energy consumption by the hybrid vehicle. This may be done in an immediate transition, or it may be phased in over a period of time in order to reduce any noticeable effects by the vehicle user.

It should be appreciated that any number of steps, techniques, methods, features, etc. may be used in conjunction with the exemplary method just described. This includes, for example, optional tasks such as keeping count of the number of start attempts of engine 60 in order to avoid or limit potential damage to vehicle components. It may use a counter that prohibits further start attempts once a certain number is achieved. Furthermore, the exemplary method can notify a vehicle user that the problems or issues with the auxiliary power source are resolved or still persist through user interface 82. One way to accomplish this is by clearing any warning signals or messages that were previously set. It is also possible for method 200 to keep a log or recording of the various problems and issues experienced by the auxiliary power source. According to another embodiment, step 212 or some other step could first determine whether the hybrid vehicle is in compliance with applicable governmental regulations before allowing primary power source 20 to propel the hybrid vehicle.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps illustrated in FIG. 2 is just one possibility, as the present method may include a combination of steps that has fewer, greater or different steps than that shown here. Steps 216 and 218 may be omitted so that the method attempts to start the auxiliary power source in the event that a key-up event has occurred; this could be independent of the lack of fuel question. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for operating a hybrid vehicle having a primary power source and an auxiliary power source, comprising the steps of:
   (a) determining if there is a problem with the auxiliary power source;
   (b) if there is a problem with the auxiliary power source, then using a control unit to decreasing energy consumption by the hybrid vehicle; and
   (c) monitoring the previously determined problem with the auxiliary power source to determine if the previously determined problem still exists, if the previously determined problem still exists then continuing to use the control unit to decrease energy consumption by the hybrid vehicle, and if the previously determined problem does not still exist then operating the auxiliary power source to replenish the primary power source.

2. The method of claim 1, wherein step (a) further comprises determining if there is a problem with the auxiliary power source and, if so, then diagnosing the problem by gathering information from one or more electronic modules in the hybrid vehicle.

3. The method of claim 1, wherein step (b) further comprises notifying a vehicle user of the problem with the auxiliary power source via a user interface located within the hybrid vehicle.

4. The method of claim 1, wherein step (b) further comprises decreasing energy consumption by the hybrid vehicle by controlling one or more performance-related tasks.

5. The method of claim 4, wherein at least one of the performance-related tasks is selected from the group consisting of: controlling the torque or speed of an electric motor, or controlling the speed or acceleration of the hybrid vehicle.

6. The method of claim 1, wherein step (b) further comprises decreasing energy consumption by the hybrid vehicle by controlling one or more non-performance-related tasks.

7. The method of claim 6, wherein at least one of the non-performance tasks is selected from the group consisting of: controlling an AC compressor, controlling a cabin heater, or controlling a vehicle accessory.

8. The method of claim 1, further comprising the step of: determining if a key-up event has occurred and, if a key-up event has occurred then attempting to operate the auxiliary power source.

9. The method of claim 1, wherein the primary power source includes an electric motor that receives electrical energy from a battery, and the auxiliary power source includes an engine that receives fuel from a fuel tank.

10. A method for operating a hybrid vehicle having a primary power source and an auxiliary power source, comprising the steps of:
    (a) determining if there is a problem with the auxiliary power source;

(b) if there is a problem with the auxiliary power source, then notifying the vehicle user of the previously determined problem with the auxiliary power source, presenting the vehicle user with one or more proposed remedial actions for decreasing energy consumption by the hybrid vehicle, and providing the vehicle user with an opportunity to manually override the remedial actions; and (c) decreasing energy consumption by the hybrid vehicle according to the one or more proposed remedial actions so long as the previously determined problem still exists.

11. A method for operating a hybrid vehicle having a primary power source that includes an electric motor that receives electrical energy from a battery; and an auxiliary power source that includes an engine that receives fuel from a fuel tank, comprising the steps of:

(a) determining if there is a problem with the auxiliary power source;

(b) if there is a problem with the auxiliary power source, then using a control unit to decrease energy consumption by the hybrid vehicle by implementing a power management scheme that controls one or more performance-related tasks or non-performance-related tasks;

(c) determining if a new key-up event has occurred;

(d) determining if the problem is due to a lack of fuel for the engine;

(e) determining if any fuel has been added; and (f) if a new key-up event has occurred and the problem with the engine is not due to a lack of fuel or if the problem with the engine is due to a lack of fuel but fuel has been added, then starting the engine and checking to see if the problem with the engine still persists.

12. A method for operating a hybrid vehicle having a primary power source that includes an electric motor that receives electrical energy from a battery, and an auxiliary power source that includes an engine that receives fuel from a fuel tank, comprising the steps of:

(a) determining if there is a problem with the engine of the auxiliary power source;

(b) if there is a problem with engine of the auxiliary power source, then using a control unit to implement a power management scheme that controls one or more performance-related tasks and non-performance-related tasks in order to decrease energy consumption by the hybrid vehicle; and (c) monitoring the previously determined problem with the engine to determine if it still exists, and if the previously determined problem does not still exist then operating the engine of the auxiliary power source so that it drives a generator and generates electrical energy to restore the battery for the electric motor.

13. A method for operating a hybrid vehicle having a primary power source that includes an electric motor that receives electrical energy from a battery, and an auxiliary power source that includes an engine that receives fuel from a fuel tank, comprising the steps of:

(a) determining if there is a problem with the auxiliary power source;

(b) if there is a problem with the auxiliary power source, then using a control unit to decrease energy consumption by the hybrid vehicle;

(c) monitoring the problem with the auxiliary power source to determine if it still exists;

(d) determining if a new key-up event has occurred;

(e) determining if the problem is due to a lack of fuel for the engine;

(f) determining if any fuel has been added; and (g) if a new key-up event has occurred and the problem with the engine is not due to a lack of fuel or if the problem with the engine is due to a lack of fuel but fuel has been added, then starting the engine and checking to see if the problem with the engine still persists.

14. A method for operating a hybrid vehicle having a primary power source and an auxiliary power source, comprising the steps of:

(a) determining if there is a problem with the auxiliary power source, if so, using a control unit to diagnose the problem by gathering information from one or more electronic modules in the hybrid vehicle;

(b) if there is a problem with the auxiliary power source, then using the control unit to decrease energy consumption by the hybrid vehicle by implementing a power management scheme that controls one or more performance-related tasks or non-performance-related tasks; and (c) monitoring the previously determined problem with the auxiliary power source to determine if the previously determined problem still exists, if the previously determined problem still exists then continuing to implement the power management scheme, and if the previously determined problem does not still exist then operating the auxiliary power source to replenish the primary power source.

15. The method of claim 14, further comprising the steps of:

notifying a vehicle user of the problem with the auxiliary power source via a user interface located within the hybrid vehicle;

presenting the vehicle user with one or more proposed remedial actions; and providing the vehicle user with an opportunity to manually override the remedial actions.

16. The method of claim 14, wherein the power management scheme controls at least one performance-related task selected from the group consisting of: controlling the torque or speed of an electric motor, or controlling the speed or acceleration of the hybrid vehicle.

17. The method of claim 14, wherein the power management scheme controls at least one non-performance-related task selected from the group consisting of: controlling an AC compressor, controlling a cabin heater, or controlling a vehicle accessory.

18. The method of claim 14, further comprising the step of:

determining if a key-up event has occurred and, if a key-up event has occurred then attempting to operate the auxiliary power source.

19. The method of claim 14, wherein the primary power source includes an electric motor that receives electrical energy from a battery, and the auxiliary power source includes an engine that receives fuel from a fuel tank.

* * * * *